United States Patent
Kasada et al.

(10) Patent No.: US 9,711,174 B2
(45) Date of Patent: *Jul. 18, 2017

(54) MAGNETIC TAPE AND METHOD OF MANUFACTURING THE SAME

(71) Applicant: FUJIFILM CORPORATION, Tokyo (JP)

(72) Inventors: Norihito Kasada, Minami-ashigara (JP); Masahito Oyanagi, Minami-ashigara (JP); Toshio Tada, Minami-ashigara (JP); Kazuyuki Kitada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/757,555

(22) Filed: Dec. 24, 2015

(65) Prior Publication Data

US 2016/0189739 A1 Jun. 30, 2016

(30) Foreign Application Priority Data

Dec. 26, 2014 (JP) .................................. 2014-265728
Dec. 22, 2015 (JP) .................................. 2015-249264

(51) Int. Cl.
*G11B 5/71* (2006.01)
*G11B 5/73* (2006.01)
*G11B 5/84* (2006.01)
*G11B 5/842* (2006.01)
*G11B 5/78* (2006.01)

(52) U.S. Cl.
CPC .............. *G11B 5/71* (2013.01); *G11B 5/7305* (2013.01); *G11B 5/842* (2013.01); *G11B 5/8404* (2013.01); *G11B 5/78* (2013.01)

(58) Field of Classification Search
None
See application file for complete search history.

(56) References Cited

U.S. PATENT DOCUMENTS

| 5,445,881 | A * | 8/1995 | Irie | G11B 5/70 |
| | | | | 427/130 |
| 5,786,074 | A * | 7/1998 | Soui | G11B 5/70 |
| | | | | 428/323 |
| 6,254,964 | B1 * | 7/2001 | Saito | G11B 5/70 |
| | | | | 428/323 |
| 2001/0038928 | A1 * | 11/2001 | Nakamigawa | G11B 5/70 |
| | | | | 428/832.2 |
| 2009/0027812 | A1 * | 1/2009 | Noguchi | G11B 5/00826 |
| | | | | 360/324.11 |
| 2013/0029183 | A1 * | 1/2013 | Omura | G11B 5/735 |
| | | | | 428/844.8 |
| 2016/0064025 | A1 * | 3/2016 | Kurokawa | G11B 5/71 |
| | | | | 428/840.4 |
| 2016/0093323 | A1 * | 3/2016 | Omura | G11B 5/733 |
| | | | | 428/840.3 |
| 2017/0032812 | A1 * | 2/2017 | Kasada | G11B 5/8404 |

FOREIGN PATENT DOCUMENTS

| JP | 2002-367142 A | 12/2002 |
| JP | 2008-243317 A | 10/2008 |

OTHER PUBLICATIONS

Office Action dated Dec. 5, 2016 in copending U.S. Appl. No. 14/978,834.
Notice of Allowance dated May 8, 2017 from U.S. Patent & Trademark Office in co-pendng U.S. Appl. No. 14/978,834.

* cited by examiner

*Primary Examiner* — Kevin Bernatz
(74) *Attorney, Agent, or Firm* — Sughrue Mion, PLLC (57) ABSTRACT

Provided is a magnetic tape, which comprises, on a nonmagnetic support, a nonmagnetic layer comprising nonmagnetic powder and binder, and on the nonmagnetic layer, a magnetic layer comprising ferromagnetic powder and binder; wherein a total thickness of the magnetic tape is less than or equal to 4.80 μm; at least the magnetic layer comprises one or more components selected from the group consisting of a fatty acid and a fatty acid amide; and a C—H derived carbon, C, concentration calculated from a C—H peak area ratio in a C1s spectrum obtained by X-ray photoelectron spectroscopy conducted at a photoelectron take-off angle of 10 degrees on a surface on the magnetic layer side of the magnetic tape is greater than or equal to 45 atom %.

15 Claims, 1 Drawing Sheet

MAGNETIC TAPE AND METHOD OF MANUFACTURING THE SAME

CROSS-REFERENCE TO RELATED APPLICATIONS

This application claims priority under 35 U.S.C 119 to Japanese Patent Application No. 2014-265728 filed on Dec. 26, 2014 and Japanese Patent Application No. 2015-249264 filed on Dec. 22, 2015. Each of the above applications is hereby expressly incorporated by reference, in its entirety.

BACKGROUND OF THE INVENTION

Field of the Invention

The present invention relates to a magnetic tape and method of manufacturing the same.

Discussion of the Background

Magnetic recording media include tape-shaped media and disk-shaped media. Magnetic recording media in the form of tapes, that is, magnetic tapes, are primarily employed in storage applications such as data-backup tapes. To record and reproduce signals on a magnetic tape, the magnetic tape is normally run within a drive and the surface on the magnetic layer side of the magnetic tape and a magnetic head (also simply referred to as a "head", hereinafter) are brought into contact and slide.

In the recording and reproduction, with repeated running in a state where there is a high coefficient of friction as the head slides over the surface on the magnetic layer side, the surface on the magnetic layer side may be shaved, generating shavings. The output will sometimes end up varying due to the spacing caused by the shavings (spacing loss). Such spacing loss may compromise the electromagnetic characteristic with repeated running. Accordingly, to prevent an increase in the coefficient of friction with repeated running, the conventional practice has been to add a lubricant to the magnetic layer surface or the magnetic layer. More specifically, lubricant has been coated (known as an "overcoat") on the surface of the magnetic layer or the magnetic layer has been formed with a magnetic layer forming composition containing lubricant (for example, see Japanese Unexamined Patent Publication (KOKAI) No. 2008-243317, which is expressly incorporated herein by reference in its entirety).

SUMMARY OF THE INVENTION

With regard to magnetic tapes, to increase the recording capacity per magnetic tape cartridge of magnetic tape, it is desirable to decrease the total thickness of the magnetic tape (that is, to render the magnetic tape thinner) and thus increase the overall length of the magnetic tape wound up within each magnetic tape cartridge.

It is also desirable to examine how to enhance performance by envisioning the various use environments of magnetic tapes. That is because, while magnetic tapes are placed in high-humidity environments during the rainy season for example, they are also sometimes used in low-humidity environments, such as in data centers where the humidity is managed.

Based on investigation conducted by the present inventors, the addition of lubricant to the surface of the magnetic layer or to the magnetic layer as has conventionally been conducted was found to make it difficult to inhibit a drop in the electromagnetic characteristic with repeated running in both environments of low humidity (for example, a relative humidity of about 15%) and environments of high humidity (for example, a relative humidity of 80%), particularly in magnetic tapes the total thickness of which has been reduced to less than or equal to 4.80 µm.

An aspect of the present invention provides for a magnetic tape with a total thickness that is reduced to less than or equal to 4.80 µm and in which a drop in the electromagnetic characteristic with repeated running is inhibited in both high and low humidity environments.

An aspect of the present invention relates to a magnetic tape, which comprises, on a nonmagnetic support, a nonmagnetic layer comprising nonmagnetic powder and binder, and on the nonmagnetic layer, a magnetic layer comprising ferromagnetic powder and binder;

wherein a total thickness of the magnetic tape is less than or equal to 4.80 µm;

at least the magnetic layer comprises one or more components selected from the group consisting of a fatty acid and a fatty acid amide; and a C—H derived carbon, C, concentration calculated from a C—H peak area ratio in a C1s spectrum obtained by X-ray photoelectron spectroscopy conducted at a photoelectron take-off angle of 10 degrees on a surface on the magnetic layer side of the magnetic tape is greater than or equal to 45 atom %. Although the total thickness of the above magnetic tape is reduced to less than or equal to 4.80 µm, it can exhibit good electromagnetic characteristics even with repeated running in both high and low humidity environments. The presumptions of the present inventors in this regard are given further below.

In one embodiment, the C—H derived C concentration falls within a range of 45 atom % to 80 atom %.

In one embodiment, the C—H-derived C concentration falls within a range of 45 atom % to 70 atom %.

In one embodiment, the C—H derived C concentration falls within a range of 50 atom % to 65 atom %.

In one embodiment, the magnetic layer and the nonmagnetic layer each contain at least one component selected from the group consisting of a fatty acid and a fatty acid amide.

In one embodiment, either one of, or both, the magnetic layer and the nonmagnetic layer further contains a fatty acid ester.

In one embodiment, the magnetic tape comprises a backcoat layer on the nonmagnetic support on the opposite side from the magnetic layer and nonmagnetic layer.

In one embodiment, the center line average surface roughness, Ra, as measured with a noncontact surface profiler on the surface on the magnetic layer side of the magnetic tape is less than or equal to 1.8 nm.

In one embodiment, the above ferromagnetic powder is selected from the group consisting of ferromagnetic hexagonal ferrite powder and ferromagnetic metal powder.

A further aspect of the present invention relates to a method of manufacturing the above magnetic tape, which comprises a step of forming a nonmagnetic layer and a step of forming a magnetic layer, wherein the step of forming the nonmagnetic layer comprises:

a coating step of forming a coating layer by coating on a nonmagnetic support a nonmagnetic layer forming composition comprising one or more components selected from the group consisting of a fatty acid and a fatty acid amide, nonmagnetic powder, binder, and solvent;

a heating and drying step of drying the coating layer by a heat treatment; and the step of forming the nonmagnetic layer further comprises, between the coating step and the heating and drying step, a cooling step of cooling the coating layer.

In one embodiment, the cooling step is conducted by placing the coating layer in a cooling atmosphere of −10° C. to 0° C.

In one embodiment, the solvent contained in the nonmagnetic layer forming composition contains ketone solvent.

In one embodiment, the step of forming a magnetic layer comprises:

a coating step of forming a coating layer by coating on a nonmagnetic layer a magnetic layer forming composition comprising ferromagnetic powder, binder, and solvent; and a heating and drying step of drying the coating layer by a heat treatment.

In one embodiment, the magnetic layer forming composition further comprises one or more components selected from the group consisting of a fatty acid and a fatty acid amide.

In one embodiment, either one of, or both, the nonmagnetic layer forming composition and the magnetic layer forming composition further comprises a fatty acid ester.

An aspect of the present invention can provide a magnetic tape, in which the drop in the electromagnetic characteristic with repeated running is inhibited in both high and low humidity environments, in the form of a magnetic tape that can achieve increased recording capacity by having a total thickness of less than or equal to 4.80 µm.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic tape according to an aspect of the present invention is a magnetic tape, which comprises, on a nonmagnetic support, a nonmagnetic layer comprising nonmagnetic powder and binder, and on the nonmagnetic layer, a magnetic layer comprising ferromagnetic powder and binder; wherein a total thickness of the magnetic tape is less than or equal to 4.80 µm; at least the magnetic layer comprises one or more components selected from the group consisting of a fatty acid and a fatty acid amide; and a C—H derived carbon, C, concentration calculated from a C—H peak area ratio in a C1s spectrum obtained by X-ray photoelectron spectroscopy conducted at a photoelectron take-off angle of 10 degrees on a surface on the magnetic layer side of the magnetic tape is greater than or equal to 45 atom %.

X-ray photoelectron spectroscopy is an analysis method that is commonly referred to as electron spectroscopy for chemical analysis (ESCA) or X-ray photoelectron spectroscopy (XPS). Hereinafter, X-ray photoelectron spectroscopy will also be referred to as ESCA. ESCA is an analysis method that exploits the fact that photoelectrons are released when the surface of a sample being measured is irradiated with X-rays. It is widely employed as an analysis method for the surface layer portions of samples being measured. ESCA makes it possible to employ the X-ray photoelectron spectrum obtained by analysis of the surface of a sample being measured to conduct qualitative and quantitative analysis. Within the depth from the outer surface of the sample to the analysis position (also referred to hereinafter as the "detection depth") and the photoelectron take-off angle, the following equation generally holds true: detection depth is nearly equal to (nearly equal to) average free path of electrons×3×sin θ. In the equation, the detection depth is the depth at which 95% of the photoelectrons constituting the X-ray photoelectron spectrum are generated and θ is the photoelectron take-off angle. From the above equation, it will be understood that the smaller the photoelectron take-off angle, the shallower the depth from the sample surface that can be analyzed, and the larger the photoelectron take-off angle, the deeper the depth from the surface that can be analyzed. In analysis by ESCA at a photoelectron take-off angle of 10 degrees, a surface layer portion of only several nm in depth from the surface of the sample is normally the position analyzed. Accordingly, analysis by ESCA conducted at a photoelectron take-off angle of 10 degrees on the surface of the magnetic tape permits compositional analysis of an extreme outer layer portion of only about several nm in depth from the surface of the magnetic tape.

Additionally, the C—H derived C concentration is the proportion that carbon atoms C constituting C—H bonds account for relative to the 100 atom % of the total (based on atoms) of all elements detected by qualitative analysis by ESCA. In the above magnetic tape, at least one component selected from the group consisting of a fatty acid and a fatty acid amide is contained in at least the magnetic layer. The fatty acid and fatty acid amide are both components that can function as lubricants in magnetic tapes. In a magnetic tape containing at least one of the fatty acid and the fatty acid amide in at least the magnetic layer, the C concentration derived from C—H determined by analysis by ESCA at a photoelectron take-off angle of 10 degrees is thought by the present inventors to be an indicator of the quantity of component (at least one component selected from the group consisting of a fatty acid and a fatty acid amide) on the extreme outer layer portion of the magnetic layer. This will be described in detail below. In an X-ray photoelectron spectrum (X-axis: bond energy; Y-axis: strength) obtained by ESCA analysis, the C1s spectrum contains information about the energy peak of the 1 s orbital of carbon atoms C. In the C1 s spectrum, the peak located in the vicinity of a bond energy of 284.6 eV is the C—H peak. This C—H peak is derived from the bond energy of the C—H bonds of organic compounds. In the extreme outer portion of the magnetic layer containing at least one component selected from the group consisting of a fatty acid and a fatty acid amide, the present inventors presume that the main constituent component of the C—H peak is the component selected from the group consisting of a fatty acid and a fatty acid amide. The present inventors thus assume that it can serve as an indicator of the quantity that is present, as set forth above.

The C—H derived concentration calculated from the C—H peak area ratio in the C1s spectrum obtained by X-ray photoelectron spectroscopy conducted at a photoelectron take-off angle of 10 degrees will also be denoted as the "outer layer portion C—H derived C concentration".

Investigation by the present inventors has revealed that magnetic tapes with an outer layer portion C—H derived C concentration of greater than or equal to 45 atom % can exhibit good electromagnetic characteristics even with repeated running in both low humidity environments and high humidity environments even when the total thickness is reduced to less than or equal to 4.80 μm. The present inventors attribute this to there being a larger quantity than in conventional magnetic tapes of the at least one component selected from the group consisting of a fatty acid and a fatty acid amide in the extreme outer layer portion of the magnetic layer in magnetic tapes containing at least one component selected from the group consisting of a fatty acid and a fatty acid amide in at least the magnetic layer and having an outer layer portion C—H derived C concentration of greater than or equal to 45 atom %. By contrast, for example, the above Japanese Unexamined Patent Publication (KOKAI) No. 2008-243317 describes the coating of a lubricant (overcoat) on the surface of the magnetic layer to form a lubricant layer on the surface of the magnetic layer. However, based on investigation by the present inventors, the lubricant that is applied as an overcoat may permeate into the magnetic layer, making it difficult to obtain a magnetic tape with an outer layer portion C—H derived C concentration of greater than or equal to 45 atom % with the technique described in Japanese Unexamined Patent Publication (KOKAI) No. 2008-243317.

The present inventors presume the above to be why it is possible to achieve good electromagnetic characteristics even with repeated running in both high and low humidity environments in a magnetic tape that has been reduced in total thickness to less than or equal to 4.80 μm. However, this is merely a presumption and does not limit the present invention in any way.

The above magnetic tape will be described in greater detail below.

<Outer Layer Portion C—H Derived C Concentration>

The outer layer portion C—H derived C concentration of the above magnetic tape is greater than or equal to 45 atom %. From the perspective of inhibiting a drop in the electromagnetic characteristic with repeated running in both high and low humidity environments, it is desirably greater than or equal to 48 atom %, preferably greater than or equal to 50 atom %. Based on investigation conducted by the present inventors, the higher the outer layer portion C—H derived C concentration, the more desirable the result tends to be from the perspective of not compromising the electromagnetic characteristic with repeated running. Accordingly, for this reason, no upper limit has been set for the outer layer portion C—H derived C concentration. By way of example, the upper limit can be less than or equal to 95 atom %, less than or equal to 90 atom %, less than or equal to 85 atom %, less than or equal to 80 atom %, or less than or equal to 75 atom %. Additionally, based on investigation by the present inventors, the outer layer portion C—H derived C concentration is desirably less than or equal to 70 atom % from the perspective of obtaining a magnetic tape with a highly smooth surface on the magnetic layer side. For this reason, the outer layer portion C—H derived C concentration is desirably less than or equal to 70 atom %, preferably less than or equal to 65 atom %.

As set forth above, the outer layer portion C—H derived C concentration is a value that is determined by analysis by ESCA. The region analyzed is any 300 μm×700 μm region located on the surface on the magnetic layer side of the magnetic tape. Qualitative analysis is conducted by wide scan measurement (pass energy: 160 eV; scan range: 0 to 1,200 eV; energy resolution: 1 eV/step) by ESCA. Next, the spectra of all the elements detected by qualitative analysis are subjected to narrow scan measurement (pass energy: 80 eV, energy resolution: 0.1 eV; scan range: set for each element so that the entire spectrum measured fits). The atomic concentration (unit: atom %) of each element is then calculated from the peak areas in the various spectra obtained. The atomic concentration (C concentration) of carbon atoms is then calculated from the peak area of the C1s spectrum.

Furthermore, C1s spectrum are obtained (pass energy: 10 eV; scan range: 276 eV to 296 eV; energy resolution: 0.1 eV/step). Fitting is conducted for the C1s spectrum by the nonlinear least squares method with Gauss-Lorentz complex function (Gauss component 70%, Lorentz component 30%). The proportion of the C—H peak accounted for by the C1s spectrum (peak area ratio) is calculated. The calculated C—H peak area ratio is multiplied by the above C to calculate the C—H derived C concentration.

The arithmetic average of values obtained by conducting the above processing at three different positions on the surface on the magnetic layer side of the magnetic tape is then adopted as the outer layer portion C—H derived C concentration. The specific form of the above processing is given in Examples further below.

An example of a desirable means of adjusting the outer layer portion C—H derived C concentration to greater than or equal to 45 atom % is to conduct a cooling step in the step of forming the nonmagnetic layer, described in detail further below. However, the magnetic tape according to an aspect of the present invention is not limited to tapes manufactured with such a cooling step.

<Fatty Acid and Fatty Acid Amide>

The above magnetic tape contains at least one component selected from the group consisting of a fatty acid and a fatty acid amide in at least the magnetic layer. Just a fatty acid or just a fatty acid amide can be contained in the magnetic layer, or both can be contained. As set forth above, the present inventors assume that causing a large amount of these components to be present on the extreme outer layer portion of the magnetic layer can contribute to inhibiting a drop in the electromagnetic characteristic with repeated running of a magnetic tape with a total thickness that has been reduced to less than or equal to 4.80 µm in both high and low humidity environments. One or more components selected from the group consisting of a fatty acid and a fatty acid amide can also be contained in the nonmagnetic layer.

Examples of the fatty acid are lauric acid, myristic acid, palmitic acid, stearic acid, oleic acid, linoleic acid, linolenic acid, behenic acid, erucic acid, and elaidic acid. Stearic acid, myristic acid, and palmitic acid are desirable, and stearic acid is preferred. The fatty acid can also be incorporated into the magnetic layer in the form of salts such as metal salts.

Examples of the fatty acid amide are amides of various fatty acids, such as amide laurate, amide myristate, amide palmitate, and amide stearate.

For the fatty acid and fatty acid derivatives (amides, esters described further below, and the like), the fatty acid derived moiety of a fatty acid derivative desirably has a structure that is identical or similar to that of the fatty acid which is employed together. As an example, when employing stearic acid as a fatty acid, it is desirable to employ amide stearate and/or stearic acid ester.

The quantity of fatty acid can be, for example 0.1 to 10.0 weight parts, desirably 1.0 to 7.0 weight parts, per 100.0 weight parts of ferromagnetic powder as the content in the magnetic layer forming composition. When two or more different fatty acids are added to the magnetic layer forming composition, the content refers to the combined content thereof. Unless specifically stated otherwise, this similarly applies to the contents of other components in the this specification.

The content of fatty acid amide in the magnetic layer forming composition can be, for example, 0.1 to 3.0 weight parts, desirably 0.1 to 1.0 weight parts, per 100.0 weight parts of ferromagnetic powder.

Additionally, the fatty acid content in the nonmagnetic layer forming composition is, for example, 1.0 to 10.0 weight parts, desirably 1.0 to 7.0 weight parts, per 100.0 weight parts of nonmagnetic powder. The content of fatty acid amide in the nonmagnetic layer forming composition is, for example, 0.1 to 3.0 weight parts, desirably 0.1 to 1.0 weight parts, per 100.0 weight parts of nonmagnetic powder.

<Fatty Acid Ester>

A fatty acid ester can be incorporated, or not incorporated, into one or both the magnetic layer and nonmagnetic layer, which is described in detail further below.

An example of one reason for the drop in the electromagnetic characteristic with repeated running is the spacing loss caused by shavings from the surface on the magnetic layer side. The present inventors presume this to be one of the main factors behind the drop in the electromagnetic characteristic with repeated running in high humidity environments. The main factors behind the drop in the electromagnetic characteristic with repeated running in low humidity environments remain unclear. However, the present inventors think this could be due to a drop in performance in the removal of head grime (head cleaning capability) by the surface on the magnetic layer side.

The present inventors presume that the component selected from the group consisting of a fatty acid and a fatty acid amide can contribute to inhibiting a drop in the electromagnetic characteristic due to the above factors. By contrast, although the fatty acid ester is a component that can also function as lubricants, the present inventors presume that it does not have an effect (or have only a slight effect) on the drop in the electromagnetic characteristic due to the above factors. Lubricants generally can be roughly divided into fluid lubricants and boundary lubricants. The fatty acid ester is a component that can function as fluid lubricants, while the fatty acid amide and the fatty acid are components that can function as boundary lubricants. Boundary lubricants are thought to be lubricants that adsorb to the surface of powder (such as ferromagnetic powder), forming a strong lubricating film that lowers contact friction. Conversely, fluid lubricants are thought to form a liquid film on the surface of the magnetic layer, with the flow of the liquid film that can reduce friction. The fact that the fatty acid ester is thought to differ in its operation as lubricants from the fatty acid and the fatty acid amide in this manner is assumed by the present inventors to be the reason for the difference in the effect in reducing the drop in the electromagnetic characteristic due to the above factors by the fatty acid and the fatty acid amide. The fatty acid ester is generally considered to be lubricants that can contribute to enhancing the running durability of magnetic tapes, so the fatty acid ester can be incorporated into either one of, or both, the magnetic layer and the nonmagnetic layer, which will be described in detail further below, to enhance scratching resistance, for example.

Examples of the fatty acid ester are esters of the various fatty acids set forth above, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The quantity of fatty acid ester is, for example, 0 to 10.0 weight parts, desirably 1.0 to 7.0 weight parts, per 100.0 weight parts of ferromagnetic powder as the content in the magnetic layer forming composition.

The content of fatty acid ester in the nonmagnetic layer forming composition is, for example, 0 to 10.0 weight parts, desirably 1.0 to 7.0 weight parts, per 100.0 weight parts of nonmagnetic powder.

The magnetic layer, nonmagnetic layer, and the like of the above magnetic tape will be described next in greater detail.

<Magnetic Layer>

(Ferromagnetic Powder)

Various powders that are commonly employed as ferromagnetic powder in the magnetic layers of magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

(Binder, Curing Agent)

The magnetic tape according to an aspect of the present invention is a particulate magnetic tape that contains binder along with ferromagnetic powder in the magnetic layer. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0028 to 0031 of Japanese Unexamined Patent Publication (KOKAI) No. 2010-24113, which is expressly incorporated herein by reference in its entirety, with regard to the above binders.

Further, a curing agent can be employed along with the resin suitable for use as the binder. Polyisocyanate is suitable as the curing agent. Reference can be made to paragraphs 0124 to 0125 in Japanese Unexamined Patent Publication (KOKAI) No. 2011-216149, for details regarding polyisocyanates. The curing agent can be added to the magnetic layer forming composition in a quantity of, for example, 0 to 80.0 weight parts, preferably 50.0 weight parts to 80.0 weight parts from the perspective of enhancing the coating strength, per 100.0 weight parts of binder.

(Additive)

Additives can be added to the magnetic layer as needed. Examples of additives are abrasives, dispersing agents and dispersion adjuvants, antifungal agents, antistatic agents, oxidation inhibitors, and carbon black. The additives can be selected for use from among commercial products based on the desired properties.

It is desirable to increase the smoothness of the magnetic layer side surface in magnetic tapes for high-density recording, such as data backup tapes. By increasing the smoothness of the magnetic layer side surface, it is possible to reduce spacing loss. As a result, it is possible to achieve good electromagnetic characteristics during the reproduction of a signal recorded at high density. From these perspectives, the magnetic tape of an aspect of the present invention also desirably has a magnetic layer with a highly smooth surface.

In one embodiment, the centerline average surface roughness Ra as measured with a noncontact surface profiler on the magnetic layer side surface of the magnetic tape can be employed as an indicator of the surface smoothness of the magnetic layer side surface of the magnetic tape. The centerline average surface roughness Ra as measured by a noncontact surface profiler refers to the centerline average surface roughness Ra measured in a region with an area of 350 μm×260 μm of the magnetic layer side surface of the magnetic tape using, a 20× objective lens. An optical three-dimensional roughness meter, for example, can be employed as the noncontact surface profiler. As an example of a measurement device, a noncontact optical roughness measuring device in the form of a Newview (Japanese registered trademark) 5022 made by Zygo can be employed.

From the perspective of reducing spacing loss, the centerline average surface roughness Ra that is measured by the noncontact surface profiler on the magnetic layer surface of the magnetic tape is desirably less than or equal to 1.8 nm, preferably less than or equal to 1.7 nm, more preferably less than or equal to 1.6 nm, and still more preferably, less than or equal to 1.5 nm. From the perspective of running stability, the Ra is desirably greater than or equal to 0.2 nm.

As set forth above, the outer layer portion C—H derived C concentration is desirably less than or equal to 70 atom %, preferably less than or equal to 65 atom %, from the perspective of improving surface smoothness of the surface on the magnetic layer side of the magnetic tape.

An example of one way to increase the surface smoothness of the magnetic layer side surface of the magnetic tape is to increase the dispersion of abrasive in the magnetic layer. To that end, it is desirable to separately disperse the abrasive from the ferromagnetic powder in preparing the magnetic layer forming composition. It is preferable to separately disperse the abrasive from various granular or powder components such as the ferromagnetic powder in preparing the magnetic layer forming composition.

Another example of a way of increasing the smoothness of the surface of the magnetic layer is to employ a component (abrasive-dispersing agent) to increase the dispersion of the abrasive. An example of such a component is an aromatic hydrocarbon compound having a phenolic hydroxyl group. The term "phenolic hydroxyl group" refers to a hydroxyl group that is directly bonded to an aromatic ring.

The aromatic ring that is contained in the aromatic hydrocarbon compound having a phenolic hydroxyl group can be a single ring, can have a multiple-ring structure, or can be a fused ring. From the perspective of enhancing the dispersion of abrasive, an aromatic hydrocarbon compound comprising a benzene ring or a naphthalene ring is desirable. The aromatic hydrocarbon compound can comprise substituent(s) in addition to the phenolic hydroxyl group. From the perspective of the ready availability of compounds, examples of substituents in addition to a phenolic hydroxyl group are halogen atoms, alkyl groups, alkoxy groups, amino groups, acyl groups, nitro groups, nitroso groups, and hydroxyalkyl groups. With respect to compounds having substituent(s) in addition to the phenolic hydroxyl group, compounds having substituent(s) exhibiting an electron donating ability in the form of a Hammett substituent constant of less than or equal to 0.4 tend to be advantageous to the dispersion of abrasives. From this perspective, examples of desirable substituents are those having an electron-donating ability that is as good as or better than that of halogen atoms, more specifically, halogen atoms, alkyl groups, alkoxy groups, amino groups, and hydroxyalkyl groups.

The number of phenolic hydroxyl groups that are contained in the above aromatic hydrocarbon compound can be one, two, three, or more. When the aromatic ring present in the aromatic hydrocarbon compound is a naphthalene ring, it is desirable for two or more phenolic hydroxyl groups to be contained, preferably two. Examples of such compounds are the naphthalene ring-containing compounds denoted by general formula (1) in Japanese Unexamined Patent Publication (KOKAI) No. 2013-229090. Reference can be made to paragraphs 0028 to 0030 of that publication for details on naphthalene ring-containing compounds denoted by general formula (1) in Japanese Unexamined Patent Publication (KOKAI) No. 2013-229090. Additionally, aromatic hydrocarbon compounds containing an aromatic ring in the form of a benzene ring desirably contain one or more, preferably 1 or 2, phenolic hydroxyl groups. Examples of such compounds are the benzene ring-containing compounds denoted by general formula (2) in Japanese Unexamined Patent Publication (KOKAI) No. 2013-229090. Reference can be made to paragraphs 0032 to 0034 of that publication for details on benzene ring-containing compounds denoted by general formula (2) in Japanese Unexamined Patent Publication (KOKAI) No. 2013-229090. The content of the above publication is expressly incorporated herein by reference in its entirety.

One, two, or more aromatic hydrocarbon compounds having phenolic hydroxyl group(s) can be employed. The quantity employed is, for example, desirably about 2.0 to 20.0 weight parts per 100.0 weight parts of abrasive.

It is desirable to employ inorganic powder with Mohs hardness of higher than 8, and preferable to employ inorganic powder with Mohs hardness greater than or equal to 9, as an abrasive. The highest Mohs hardness is the 10 of diamond. Specific examples are alumina ($Al_2O_3$), silicon carbide, boron carbide ($B_4C$), TiC, cerium oxide, zirconium oxide ($ZrO_2$), and diamond powder. Of these, alumina is desirable. Alumina is also a desirable abrasive from the perspective of being able to achieve particularly good dispersion improvement when combined with the above aromatic hydrocarbon compound having phenolic hydroxyl group(s). Reference can be made to Japanese Unexamined Patent Publication (KOKAI) No. 2013-229090, paragraph 0021, with regard to alumina. The specific surface area can be employed as an indicator of abrasive particle size. The larger the specific surface area, the smaller the particle size indicated. From the perspective of increasing the smoothness of the surface of the magnetic layer, an abrasive having a specific surface area measured by the BET method (BET specific surface area) of greater than or equal to 14 $m^2/g$ is desirably employed. From the perspective of dispersion, the use of an abrasive with a BET specific surface area of less than or equal to 40 $m^2/g$ is desirably employed. The content of abrasive in the magnetic layer is desirably 1.0 to 20.0 weight parts per 100.0 weight parts of ferromagnetic powder.

The magnetic layer can contain granular nonmagnetic materials (nonmagnetic particles). From the perspective of increasing the surface smoothness of the magnetic layer side surface, colloidal particles (nonmagnetic colloidal particles) are desirable as the nonmagnetic particles. The average primary particle size of nonmagnetic colloidal particles is desirably 50 to 200 nm. The average primary particle size of the nonmagnetic colloidal particles in the present invention is a value obtained by the method described in Japanese Unexamined Patent Publication (KOKAI) No. 2011-48878, paragraph 0015. The content of the above publication is expressly incorporated herein by reference in its entirety.

Nonmagnetic colloidal particles in the form of inorganic colloidal particles are desirable and those in the form of inorganic oxide colloidal particles are preferred. From the perspective of ready availability of monodisperse colloidal particles, silica colloidal particles (colloidal silica) are particularly desirable. Reference can be made to Japanese Unexamined Patent Publication (KOKAI) No. 2011-48878, paragraph 0023, for details on nonmagnetic colloidal particles. The content of nonmagnetic colloidal particles in the magnetic layer is desirably 0.5 to 5.0 weight parts, preferably 1.0 to 3.0 weight parts, per 100.0 weight parts of ferromagnetic powder.

The magnetic layer set forth above is provided on a magnetic support over a nonmagnetic layer. Details regarding the nonmagnetic layer and nonmagnetic support will be given further below.

<Nonmagnetic Layer>

The nonmagnetic layer will be described next. In the magnetic tape according to an aspect of the present invention, a nonmagnetic layer containing nonmagnetic powder and binder is present between the nonmagnetic support and the magnetic layer. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer.

The fatty acid, fatty acid amide, and fatty acid ester that can be contained in the nonmagnetic layer are as set forth above. The binder, additives, dispersion method, and the like of the magnetic layer can also be applied to the nonmagnetic layer. In particular, techniques that are known with regard to the magnetic layer can be applied with regard to the quantity and type of binder and quantity and type of additives.

The nonmagnetic layer can be formed by coating and drying the nonmagnetic layer forming composition on the nonmagnetic layer, the details of which will be described further below. Normally, one or more solvents are contained. Various organic solvents that are generally employed in the manufacturing of particulate magnetic recording media are examples of the solvent. Specifically, the following can be employed in any ratio: ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methyl cyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethyl formamide; and hexane. Of these, from the perspective of solubility of the binders that are commonly employed in particulate magnetic recording media, one or more ketone solvent is desirably incorporated. The quantity of solvent in the nonmagnetic layer forming composition is not specifically limited. The same quantity can be employed as in the nonmagnetic layer forming composition of a common particulate magnetic recording medium.

Further, the description given above can be applied for solvents that can be incorporated in the various layer forming compositions such as the magnetic layer forming composition.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Layer Structure>

As regards the thickness of the nonmagnetic support and the various layers in the magnetic tape of an aspect of the present invention, the thickness of the nonmagnetic support is desirably 3.00 µm to 4.50 µm. The thickness of the magnetic layer can be optimized based on the magnetization saturation level of the magnetic head employed, the head gap length, and the recording signal band. Generally, it will be 10 nm to 150 nm. From the perspective of achieving higher density recording, it is desirably 20 nm to 120 nm, preferably 30 nm to 100 nm. A single magnetic layer suffices. The magnetic layer can be separated into two or more layers having differing magnetic properties. Known multilayer magnetic layer configurations can be applied.

The thickness of the nonmagnetic layer is, for example, 0.10 µm to 1.50 µm, and desirably 0.10 µm to 1.00 µm. The nonmagnetic layer of the magnetic tape according to an aspect of the present invention may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Backcoat Layer>

In the magnetic tape according to an aspect of the present invention, a backcoat layer can be present on the opposite surface of the nonmagnetic support from the surface on which the magnetic layer is present. The backcoat layer desirably contains carbon black and inorganic powder. The formulas of the magnetic layer and nonmagnetic layer can be applied to the binder and various additives for forming the backcoat layer. The thickness of the backcoat layer is desirably less than or equal to 0.90 µm, preferably 0.10 to 0.70 µm.

<Total Thickness of the Magnetic Layer>

From the perspective of increasing recording capacity, it is desirable to reduce the thickness of the magnetic tape to increase the recording capacity per magnetic tape cartridge. The magnetic tape according to an aspect of the present invention has a total thickness of less than or equal to 4.80 µm. Thus, it is a desirable magnetic tape from the perspective of increasing recording capacity. However, as set forth above, a magnetic tape with a total thickness of less than or equal to 4.80 µm may exhibit a phenomenon of a drop in the electromagnetic characteristic with repeated running in both high and low humidity environments. The present inventors assume the reason for this, for example, to be that by reducing the total thickness of the magnetic tape, the strength of the magnetic tape may decrease and it may become flexible. As a result, relative to a magnetic tape with a total thickness in excess of 4.80 μm, the state of contact between the surface of the magnetic tape and the head during running may change. However, this is merely speculation, and the actual reasons remain unclear. An aspect of the present invention can resolve the above phenomenon by imparting a C—H derived C concentration in the outer layer portion of greater than or equal to 45 atom % to a magnetic tape containing at least one component selected from the group consisting of a fatty acid and a fatty acid amide in at least the magnetic layer. The total thickness of the magnetic tape is, for example, less than or equal to 4.50 μm, or less than or equal to 4.30 μm. However, at less than or equal to 4.80 μm, an adequate enhancement in recording capacity can be achieved. Thus, a total thickness in excess of 4.50 μm or 4.30 μm is also possible. From the perspective of ease of handling (the handling property of) the magnetic tape, the total thickness of the magnetic tape is desirably greater than or equal to 1.0 μm.

The thickness of the various layers and nonmagnetic support of the magnetic tape, as well as the total thickness, can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

<Manufacturing Process>
(Preparation of Composition for Forming Each Layer)

Compositions (coating liquids) for forming the magnetic layer, nonmagnetic layer, and backcoat layer normally contain solvent in addition to the various components set forth above. The various organic solvents that are commonly employed to manufacture particulate magnetic tapes can be employed. The process of preparing the compositions for forming the various layers normally includes at least a kneading step, a dispersion step, and mixing steps provided before and after these steps as needed. Each of these steps can be divided into two or more stages. All of the starting materials in the form of ferromagnetic powder, nonmagnetic powder, fatty acid, fatty acid amide, binder, various optionally added additives, solvent, and the like that are employed in the present invention can be added at the start, or part way through, any of these steps. An individual starting material can be divided for addition in two or more steps. In preparing the composition for forming the magnetic layer, as set forth above, it is desirable to separately disperse the abrasive and ferromagnetic powder. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed.

(Coating Step, Cooling Step, and Heating and Drying Step)

The magnetic layer can be formed by multilayer coating the magnetic layer forming composition either successively or simultaneously with the nonmagnetic layer forming composition. Reference can be made to Japanese Unexamined Patent Publication (KOKAI) No. 2010-231843, paragraph 0066, for details regarding coating to form the various layers. The content of the above publication is expressly incorporated herein by reference in its entirety.

In one desirable embodiment, the magnetic tape of an aspect of the present invention can be manufactured by sequential multilayer coating. The manufacturing steps in sequential multilayer coating are desirably conducted as follows. The nonmagnetic layer is formed by a coating step of forming a coating layer of the nonmagnetic layer forming composition on the nonmagnetic support by coating; and a heating and drying step of drying by a heat treatment the coating layer that has been formed. The magnetic layer forming composition is then coated on the nonmagnetic layer that has been formed in a coating step to form a coating layer, followed by a heating and drying step of drying by a heat treatment the coating layer that has been formed to form the magnetic layer.

In the manufacturing method by sequential multilayer coating, the nonmagnetic layer forming step can be conducted using a nonmagnetic layer forming composition containing one or more components selected from the group consisting of a fatty acid and a fatty acid amide in the coating step. Between the coating step and the heating and drying step, it is desirable to conduct a cooling step of cooling the coating layer to adjust the C—H derived C concentration to greater than or equal to 45 atom % in a magnetic tape containing one or more components selected from the group consisting of a fatty acid and a fatty acid amide in at least the magnetic layer. Although the reasons for this are unclear, the present inventors assume that cooling the coating layer of the nonmagnetic layer forming composition prior to the heating and drying step might facilitate migration of the above component (fatty acid, fatty acid amide) onto the nonmagnetic layer surface during solvent volatization in the heating and drying step. However, this is merely conjecture, and does not limit the present invention in any way.

That is, an aspect of the present invention relates to a method of manufacturing the above magnetic tape, which comprises a step of forming a nonmagnetic layer and a step of forming a magnetic layer, wherein the step of forming the nonmagnetic layer comprises:

a coating step of forming a coating layer by coating on a nonmagnetic support a nonmagnetic layer forming composition comprising one or more components selected from the group consisting of a fatty acid and a fatty acid amide, nonmagnetic powder, binder, and solvent;

a heating and drying step of drying the coating layer by a heat treatment; and the step of forming the nonmagnetic layer further comprises, between the coating step and the heating and drying step, a cooling step of cooling the coating layer.

In the step of forming the magnetic layer, a coating step of forming a coating layer by coating on a nonmagnetic layer a magnetic layer forming composition containing ferromagnetic powder, binder, and solvent can be conducted, and a heating and drying step of drying by a heat treatment the coating layer that has been formed can be conducted. The magnetic tape of an aspect of the present invention contains in at least the magnetic layer one or more components selected from the group consisting of a fatty acid and a fatty acid amide. It is desirable for the magnetic layer forming composition to contain one or more components selected from the group consisting of a fatty acid and a fatty acid amide to manufacture the magnetic tape. However, it is not essential that one or more components selected from the group consisting of a fatty acid and a fatty acid amide be contained in the magnetic layer forming composition. That is because it is conceivable to form a magnetic layer containing one or more components selected from the group consisting of a fatty acid and a fatty acid amide by forming a magnetic layer by coating a magnetic layer forming composition on a nonmagnetic layer after the component contained in the nonmagnetic layer forming composition has migrated to the surface of the nonmagnetic layer.

A specific embodiment of the manufacturing method will be described below based on FIG. 1. However, the present invention is not limited to the specific embodiment given below.

Figure 1:
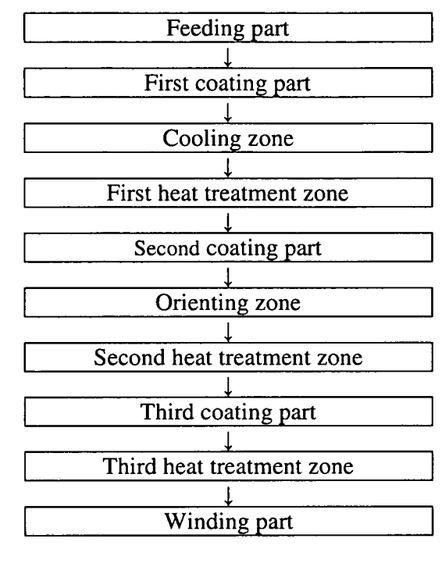
FIG. 1 shows an example (a schematic process diagram) of a specific embodiment of the process of manufacturing a magnetic tape.

FIG. 1 is a schematic process diagram showing a specific embodiment of the steps of manufacturing a magnetic tape having a backcoat layer on the other surface of a nonmagnetic support from that on which are sequentially present a nonmagnetic layer and a magnetic layer. In the embodiment shown in FIG. 1, a nonmagnetic support (long film) is continuously subjected to an operation of being fed by a feeding part and being wound up in a winding part. In various parts or various zones shown in FIG. 1, various processes such as coating, drying, and orienting can be conducted to form by sequential multilayer coating a nonmagnetic layer and a magnetic layer on one surface of a nonmagnetic support that is running, and a backcoat layer can be formed on the other surface. With the exception of comprising a cooling zone, the manufacturing process can be identical to the one that is commonly conducted to manufacture a particulate magnetic recording medium.

In a first coating part, the nonmagnetic layer forming composition is coated on the nonmagnetic support that has been fed from the feeding part (step of coating the nonmagnetic layer coating composition).

After the above coating step, the coating layer of the nonmagnetic layer forming composition that has been formed in the coating step is cooled in a cooling zone (cooling step). For example, the cooling step can be conducted by having the nonmagnetic support on which the coating layer has been formed pass through a cooling atmosphere. The temperature of the cooling atmosphere desirably falls within a range of −10° C. to 0° C., preferably within a range of −5° C. to 0° C. The duration of the cooling step (for example, the time from when some portion of the coating layer is conveyed into the cooling zone to when it is conveyed out, also referred to as the "residence time" hereinafter) is not specifically limited. However, the longer it is, the higher the C—H derived C concentration tends to be. Thus, it is desirable adjusted, for example, based on preliminary testing based on the necessity of achieving a C—H derived C concentration of greater than or equal to 45 atom %. In the cooling step, a cooled gas can be blown onto the surface of the coating layer.

After the cooling zone, in the first heat treatment zone, the coating layer following the cooling step is dried by being heated (heating and drying step). The heating and drying step can be conducted by causing the nonmagnetic support on which the coating layer is present following the cooling step to pass through a heating atmosphere. Here, the temperature of the heating atmosphere is, for example, about 60° C. to 140° C. However, any temperature that will dry the coating layer by evaporating the solvent will do, and there is no limit to the above range. A heated gas can be optionally blown onto the surface of the coating layer. The same holds true for the heating and drying step in the second heat treatment zone and the heating and drying step in the third heat treatment zone, described further below.

In the second coating part, the magnetic layer forming composition is coated on the nonmagnetic layer that has been formed by the heating and drying step in the first heat treatment zone (magnetic layer forming composition coating step).

Subsequently, while the coating layer of the magnetic layer forming composition is still wet, a step of orienting the ferromagnetic powder in the coating layer is conducted in an orienting zone. Reference can be made to Japanese Unexamined Patent Publication (KOKAI) No. 2010-231843, paragraph 0067, with regard to orientation processing.

The coating layer following the orientation processing is subjected to a heating and drying step in a second heat treatment zone.

Then, in a third coating part, a backcoat layer forming composition is coated to the surface on the opposite side of the nonmagnetic support from the surface on which the nonmagnetic layer and magnetic layer have been formed to form a coating layer (the backcoat layer forming composition coating step). Subsequently, the coating layer is heat treated and dried in a third heat treatment zone.

A magnetic tape can be obtained with a nonmagnetic layer and magnetic layer present in that order on one surface of a nonmagnetic support, and a backcoat layer present on the other surface. The magnetic tape obtained can be wound up on the winding part and then optionally subjected to various post-processing (various surface processing such as calendering). Known post-processing techniques in the manufacturing of particulate magnetic recording media can be applied without restriction. For example, reference can be made to Japanese Unexamined Patent Publication (KOKAI) No. 2010-231843, paragraph 0069, for a cutting step that is normally conducted after various post-processing.

The magnetic tape of an aspect of the present invention that has been set forth above is suitable for use as a magnetic tape employed in both low-humidity environments and high-humidity environments.

EXAMPLES

The present invention will be described in greater detail below through Examples. However, the present invention is not limited to the embodiments shown in Examples. The "parts" and "percent (%)" indicated below denote "weight parts" and "weight percent (%)".

The weight average molecular weights given below are values obtained by measurement by gel permeation chromatography (GPC) under the following conditions with polystyrene conversion.

GPS device: HLC-8120 (made by Tosoh):

Column: TSK gel Multipore HXL-M (made by Tosoh, 7.8 mm ID (inner diameter)×30.0 cm)

Eluent: Tetrahydrofuran (THF)

Examples 1 to 14, Comparative Examples 1 to 13

1. Preparation of Alumina Dispersion

To 100.0 parts of alumina powder (HIT-80 made by Sumitomo Chemical Co.) with an alpha conversion rate of about 65% and a BET specific surface area of 20 m²/g were admixed 3.0 parts of 2,3-dihydroxynaphthalene (made by Tokyo Kasei), 31.3 parts of a 32% solution (in a solvent in the form of a mixed solvent of methyl ethyl ketone and toluene) of polyester polyurethane resin (UR-4800 made by Toyobo (Japanese registered trademark) with polar groups in the form of $SO_3Na$ groups (polar group quantity: 80 meq/kg)), and 570.0 parts of a solvent in the form of a mixed solution of 1:1 (weight ratio) methyl ethyl ketone and cyclohexanone. The mixture was dispersed for 5 hours in a paint shaker in the presence of zirconia beads. Following dispersion, the dispersion and the beads were separated with a mesh, yielding an alumina dispersion.

2. Formula of Magnetic Layer Forming Composition

| (Magnetic liqiud) | |
|---|---|
| Ferromagnetic powder | 100.0 parts |
| Ferromagnetic hexagonal barium ferrite powder or ferromagnetic metal powder (see Table 5) | |
| Polyurethane resin containing $SO_3Na$ groups | 14.0 parts |
| Weight average molecular weight: 70,000; | 150.0 parts |
| $SO_3Na$ groups: 0.2 meq/g Cyclohexanone | |
| Methyl ethyl ketone | 150.0 parts |
| (Abrasive liquid) | |
| Alumina dispersion prepared in 1. above | 6.0 parts |
| (Silica sol) | |
| Colloidal silica (average particle size 120 nm) | 2.0 parts |
| Methyl ethyl ketone | 1.4 parts |
| (Other components) | |
| Stearic acid | See Table 5 |
| Amide stearate | See Table 5 |
| Butyl stearate | See Table 5 |
| Polyisocyanate | 2.5 parts |
| (Coronate (Japanese registered trademark) made by Nippon Polyurethane Industry Co., Ltd. | |
| (Finishing solvents) | |
| Cyclohexanone | 200.0 parts |
| Methyl ethyl ketone | 200.0 parts |

In Table 5, BaFe denotes ferromagnetic barium ferrite powder with an average particle size (average plate diameter) of 21 nm and MP denotes ferromagnetic metal powder with an average particle size (average major axis length) of 30 nm.

3. Formula of Nonmagnetic Layer Forming Composition

| Nonmagnetic inorganic powder: α-iron oxide | 100.0 parts |
|---|---|
| Average particle size (average major axis length): 0.15 μm | |
| Average acicular ratio: 7 | |
| BET specific surface area: 52 m²/g | |
| Carbon black | 20.0 parts |
| Average particle size: 20 nm | |
| Polyurethane resin containing $SO_3Na$ groups | 18.0 parts |
| Weight average molecular weight: | |
| 70,000 $SO_3Na$ groups: 0.2 meq/g | |
| Stearic acid | See Table 5 |
| Amide stearate | See Table 5 |
| Butyl stearate | See Table 5 |
| Cyclohexanone | 300.0 parts |
| Methyl ethyl ketone | 300.0 parts |

4. Formula of Backcoat Layer Forming Composition

| Nonmagnetic inorganic powder: α-iron oxide | 80.0 parts |
|---|---|
| Average particle size (average major axis length): 0.15 μm | |
| Average acicular ratio: 7 | |
| BET specific surface area: 52 m²/g | |
| Carbon black | 20.0 parts |
| Average particle size 20 nm | |
| Vinyl chloride copolymer | 13.0 parts |
| Polyurethane resin containing sulfonate groups | 6.0 parts |
| Phenylphosphonic acid | 3.0 parts |
| Cyclohexanone | 155.0 parts |
| Methyl ethyl ketone | 155.0 parts |
| Polyisocyanate | 5.0 parts |
| Cyclohexanone | 200.0 parts |

Preparation of Various Layer Forming Compositions

The magnetic layer forming composition was prepared by the following method. The above magnetic liquid was prepared using a batch-type vertical sand mill to disperse (bead dispersion) the various components for 24 hours. Zirconia beads of 0.5 mm ϕ were employed as the dispersion beads. Using the above sand mill, the magnetic liquid that had been prepared and the above abrasive liquid were mixed with the other components (silica sol, other components, and finishing solvents) and dispersed with beads for 5 minutes. Subsequently, a batch-type ultrasonic device (20 kHz, 300 W) was used to conduct processing for 0.5 minutes (ultrasonic dispersion). Subsequently, filtration was conducted with a filter having an average pore size of 0.5 μm to prepare the magnetic layer forming composition.

The nonmagnetic layer forming composition was prepared by the following method. The various components excluding the stearic acid, cyclohexanone, and methyl ethyl ketone were dispersed for 24 hours in a batch-type vertical sand mill to obtain a dispersion. Zirconia beads of 0.5 mm ϕ were employed as the dispersion beads. Subsequently, the remaining components were added to the dispersion that had been obtained, and stirring was conducted in a dissolver. The dispersion thus obtained was filtered with a filter having an average pore size of 0.5 μm to prepare the nonmagnetic layer forming composition.

The backcoat layer forming composition was prepared by the following method. The various components excluding the polyisocyanate and cyclohexanone were kneaded and diluted in an open kneader. Subsequently, a horizontal-type bead mill disperser was used to conduct dispersion with 1 mm ϕ zirconia beads at a bead fill rate of 80% and a rotor tip speed of 10 m/s in 12 passes with a residence time of 2 minutes per pass. Subsequently, the remaining components were added to the dispersion that had been obtained and stirring was conducted in a dissolver. The dispersion thus obtained was filtered with a filter having an average pore diameter of 1 μm to prepare the backcoat layer forming composition.

6. Fabrication of Magnetic Tape

A magnetic tape was fabricated by the specific embodiment shown in FIG. 1. Specifically, this was done as follows.

A support made of polyethylene naphthalate with a thickness shown in Table 5 was fed out from a feeding part. In a first coating part, the nonmagnetic layer forming composition prepared in 5. above was coated on one surface in a first coating part so as to yield the dry thickness shown in Table 5 upon drying to form a coating layer. While the coating layer that had been formed was still wet, it was passed through a cooling zone that had been adjusted to an atmospheric temperature of 0° C. with the residence time indicated in Table 5 to conduct a cooling step. Subsequently, it was passed through a first heat treatment zone with an atmospheric temperature of 100° C. to conduct a heating and drying step, thus forming a nonmagnetic layer.

Subsequently, the magnetic layer forming composition prepared in 5. above was coated over the nonmagnetic layer so as to yield a thickness upon drying shown in Table 5 in a second coating part to form a coating layer. While this coating layer was still wet (had not yet dried), a magnetic field with a magnetic strength of 0.3 T was applied perpendicularly with respect to the surface of the coating layer of the magnetic layer forming composition in an orienting zone to conduct a perpendicular orientation processing. Subsequently, drying was conducted in a second heat treatment zone (with an atmospheric temperature of 100° C.).

Subsequently, the backcoat layer forming composition prepared in 5. above was coated in the third coating part so as to yield a thickness upon drying shown in Table 5 on the opposite surface of the polyethylene naphthalate support from the surface on which the nonmagnetic layer and magnetic layer had been formed, forming a coating layer. The coating layer that had been formed was dried in a third heat treatment zone (with an atmospheric temperature of 100° C.).

Subsequently, a calendering processing (surface smoothing treatment) was conducted with a calender comprised solely of metal rolls at a speed of 80 m/minute, a linear pressure of 300 kg/cm, and a temperature of 100° C. A 36 hour heat treatment was then conducted in an environment of an atmospheric temperature of 70° C. Following the heat treatment, the product was slit to a width of ½ inch (0.0127 meter) to obtain a magnetic tape.

In Comparative Examples 1, 4 to 13 for which "Not implemented" is recorded in the cooling zone residence time column in Table 5, magnetic tapes were fabricated by a manufacturing process that did not include a cooling zone.

In Comparative Example 13, following the above calendering processing, a corona treatment was implemented on the surface of the magnetic layer by the method given below, followed by the application of a stearic acid overcoat.

A corona treatment was implemented by the method described in Japanese Unexamined Patent Publication (KOKAI) No. 2008-243317, paragraph 0138, on the surface of the magnetic layer. Next, a 10% methyl ethyl ketone solution of stearic acid was applied with a wire bar and dried on the surface of the magnetic layer that had been subjected to the corona treatment, after which the above heat treatment and slitting were conducted.

The thickness of the various layers of the magnetic tapes that had been fabricated and the nonmagnetic support was determined by the following method. The various thicknesses was confirmed to be the thickness indicated in Table 5.

The cross section of the magnetic tapes in the direction of thickness was exposed by ion beam, and observation of the exposed cross section was conducted by a scanning electron microscope. In observing the cross section, the various thicknesses were obtained as the arithmetic average of thicknesses obtained in two spots in the direction of thickness.

1. Outer Layer Portion C—H Derived C Concentration

X-ray photoelectron spectroscopy was conducted with an ESCA device on the magnetic layer side surface (measurement region: 300 μm×700 μm) of the magnetic tapes of Examples and Comparative Examples by the following method. The C—H derived C concentration was calculated from the analysis results. The calculated values are given in Table 5.

(Analytic and Calculation Methods)

The measurements of (1) to (3) below were all conducted under the conditions shown in Table 1.

TABLE 1

| | |
|---|---|
| Device | AXIS-ULTRA made by Shimadzu Corp. |
| Excitation X-ray source | Monochromatized Al-Kα radiation (output: 15 kV, 20 mA) |
| Analyzer mode | Spectrum |
| Lens mode | Hybrid (analysis area: 300 μm × 700 μm) |
| Neutralizing electron gun for charge compensation (charge neutralizer) | On (used) |
| Photoelectron take-off angle | 10 deg. or 90 deg. (angle of device relative to sample surface) |

(1) Wide Scan Measurement

The types of elements detected by wide scan measurement (measurement conditions: see Table 2) by ESCA on the magnetic layer side surface of the magnetic tape were examined (qualitative analysis).

TABLE 2

| Scan range | Pass energy | Energy resolution (step) | Pickup time (Dwell) | Cumulative number (Sweeps) |
|---|---|---|---|---|
| 0 to 1200 eV | 160 eV | 1 eV/step | 100 ms/step | 5 |

(2) Narrow Scan Measurement

Narrow scan measurement (measurement conditions: see Table 3) was conducted for each of the elements detected in (1) above. The auxiliary data processing software of the device (Vision 2.2.6) was employed to calculate the atomic concentration (unit: atom %) of each element detected in the peak areas of the various elements. The C concentration was also calculated from the peak area of the C1s spectrum.

TABLE 3

| Spectrum[Note 1] | Scan range | Pass energy | Energy resolution (Step) | Pickup time (Dwell) | Cumulative number (Sweeps)[Note 2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |

TABLE 3-continued

| Spectrum[Note 1] | Scan range | Pass energy | Energy resolution (Step) | Pickup time (Dwell) | Cumulative number (Sweeps)[Note 2] |
|---|---|---|---|---|---|
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note 1] The spectrum (type pf element) shown in Table 3 is an example. When an element that is not shown in Table 3 was detected in the qualitative analysis of (1), identical narrow scan measurements were conducted over a scan range containing all of the spectra of elements detected.
[Note 2] For spectra with good signal-to-noise (S/N) ratios, measurements were taken a total of three times. However, the quantitative results were not affected for any of the spectra when measurements were taken a total of five times.

4. Obtaining the C is Spectrum

C1s spectra were obtained under the measurement conditions given in Table 4. The auxiliary data processing software (Vision 2.2.6) of the device was used to compensate for the shift (physical shift) due to the sample charge in the C1s spectrum obtained. The same software was then used to conduct fitting (peak separation) of the C1s spectrum. In peak separation, a Gauss-Lorentz complex function (Gauss component 70%, Lorentz component 30%) was employed, fitting of the C1s spectrum was conducted by the nonlinear least squares method, and the proportion of the C—H peak accounted for by the C1s spectrum (peak area ratio) was calculated. The calculated C—H peak area ratio was multiplied by the C concentration obtained in (2) above to calculate the C—H derived C concentration.

TABLE 4

| Spectrum | Scan range | Pass energy | Energy resolution (Step) | Pickup time (Dwell) | Cumulative number (Sweeps) |
|---|---|---|---|---|---|
| C1s | 276 to 296 eV | 10 eV | 0.1 eV/step | 200 ms/step | 20 |

The arithmetic average of values obtained by conducting the above processing three times at different positions on the surface of the magnetic tape on the magnetic layer side was adopted as the outer layer portion C—H derived C concentration. The values calculated are given in Table 5.

2. Determining the Contribution of Fatty Acid and Fatty Acid Amide to the Outer Layer Portion C—H Derived C Concentration (1) Two magnetic tapes (sample tapes) were fabricated by the same method as in Example 1. One of the sample tapes was measured with the above ESCA device, and the other was solvent extracted (solvent: methanol) in an unmeasured state.

Gas chromatography analysis of the quantities of the fatty acid, fatty acid amide, and fatty acid ester in the solutions obtained by extraction revealed almost no differences in the quantitative values of the two sample tapes for the fatty acid (stearic acid) and fatty acid amide (amide stearate). However, the quantitative value of the fatty acid ester (butyl stearate) in the sample tape following measurement was markedly lower than in the unmeasured sample tape. This was attributed to the fatty acid ester having volatized in the vacuum chamber in which the sample being measured was placed during measurement in the ESCA device.

Based on the above results, the fatty acid ester was determined not to have affected the outer layer portion C—H derived C concentration obtained by analysis by ESCA.

(2) Components contained in the magnetic layer forming composition and components that are contained in the nonmagnetic layer forming composition and may migrate from the nonmagnetic layer to the magnetic layer in a magnetic tape and can thus be present in the magnetic layer are organic compounds excluding solvents and polyisocyanate (being crosslinked by any of treatments with heating) in the form of stearic acid, amide stearate, butyl stearate, 2,3-dihydroxynaphthalene, and polyurethane resin. Of these components, butyl stearate, as stated above, has been determined not to affect the outer layer portion C—H derived C concentration based on the results of (1) above.

The effects of 2,3-dihydroxynaphthalene and polyurethane resin on the outer layer portion C—H derived C concentration were determined next by the following method.

For the 2,3-dihydroxynaphthalene and polyurethane resin employed in Example 1, a C1s spectrum was obtained by the same method as above. The peak positioned in the vicinity of a bond energy of 286 eV and the C—H peak were separated by the processing set forth above for the peaks obtained. The proportion accounted for by the various separated peaks in the C1s spectrum (peak area ratios) were calculated, and the ratio of the area of the peak in the vicinity of a bond energy of 286 eV to the C—H peak was calculated.

Next, in the C1s spectrum obtained in Example 1, the peaks positioned in the vicinity of a bond energy of 286 eV were separated by the processing set forth above. While 2,3-dihydroxynaphthalene and polyurethane resin have peaks in the vicinity of a bond energy of 286 eV in the C1s spectrum, fatty acid (stearic acid) and fatty acid amide (amide stearate) do not. Accordingly, the peaks positioned in the vicinity of a bond energy of 286 eV in the C1 s spectrum obtained in Example 1 were determined to have been derived from 2,3-dihydroxynapththalene and polyurethane resin. Accordingly, using these peaks, based on the ratio of the peak areas calculated above, the contribution of 2,3-dihydroxynaphthalene and polyurethane resin to the C—H peak of the C1s spectrum obtained in Example 1 was calculated to be only about 10%. Based on these results, the greater part (about 90%) of the C—H peak in the C1 s spectrum obtained in Example 1 was determined to have been derived from fatty acid (stearic acid) and fatty acid amide (amide stearate).

Based on these results, the outer layer portion C—H derived C concentration was demonstrated to be an indicator of the quantity of fatty acid and fatty acid amide present.

3. Calculating the Decrease in the S/N Ratio Due to Repeated Running in High and Low Humidity Environments Recording and reproduction were conducted before and after running in a low humidity environment (an environment in which the temperature was kept to 32° C. and the relative humidity was kept to 15%) and in a high humidity environment (an environment in which the temperature was kept to 32° C. and the relative humidity was kept to 80%) and the electromagnetic characteristic (signal-to-noise ratio (S/N ratio)) was measured using a ½ inch (0.0127 meter) reel tester to which was secured a head.

The electromagnetic characteristic was measured by the method set forth below. The conveyance speed (speed of the tape relative to the head) was set to 5.5 m/s. Recording was conducted with a metal-in-gap (MIG) head (gap length: 0.15 μm, track width: 1.0 μm). The recording current was set to the optimal recording current for each tape. A giant magnetoresistive (GMR) head with an element thickness of 15 nm, a shield gap of 0.1 μm, and a read width of 0.5 μm was employed as the reproduction head. A signal was recorded at a linear recording density of 270 KFci. The reproduced signal was measured with a spectrum analyzer made by Shibasoku. The ratio of the output of the carrier signal to the noise integrated over the entire spectral band was adopted as the S/N ratio. The portion of the signal following the start of magnetic tape running once the signal had fully stabilized was employed.

Running consisted of 5,000 back and forth passes of the magnetic tape, each pass being 1,000 m, at a conveyance speed (relative speed of head/tape) of 6.0 m/s, using the above reel tester.

Before and after the above running, the electromagnetic characteristic was measured and the S/N ratio was obtained by the methods set forth above. The S/N ratio prior to running and the S/N ratio after running (after 5,000 back and forth passes) were calculated. The difference (S/N ratio before running)–(S/N ratio after running) was adopted as the drop in the S/N ratio. This is given in Table 5. A drop in the S/N ratio of less than or equal to 2.0 dB was determined to indicate a magnetic tape with a good electromagnetic characteristic over an extended period and with little drop in the electromagnetic characteristic with repeated running in the environments set forth above.

4. AlFeSil Abrasion Width

In the same high and low humidity environments as in 3. above, the surface of the magnetic layer of the magnetic tape was contacted at a wrap angle of 12 degrees with one edge of a square AlFeSil rod in a manner perpendicular to the longitudinal direction of the square AlFeSil rod (the square rod specified in ECMA-288/Annex H/H2). In that state, a 580 m length of magnetic tape was run back and forth 50 times at a speed of 3 m/s with a tension of 1.0 N.

An optical microscope was employed to view the edge of the square rod from above, and the width of abrasion (AlFeSil abrasion width) described based on FIG. 1 in paragraph 0015 of Japanese Unexamined Patent Publication (KOKAI) No. 2007-026564, which is expressly incorporated herein by reference in its entirety, was measured. The measurement results are given in Table 5. The abrasion width thus determined of greater than or equal to 15 μm was determined to indicate a good head cleaning capacity of the surface on the magnetic layer side of the magnetic tape, and less than or equal to 53 μm was determined to indicate the occurrence of little of the shaving of the surface on the magnetic layer side that may cause spacing loss.

Based on the results in Table 5, the magnetic tapes of Examples 1 to 14 were determined to have good head-cleaning capacity and undergo little surface shaving on the magnetic layer side in either a low humidity or high humidity environment.

Further, measurement of the AlFeSil abrasion width in a similar atmosphere kept to a temperature of 32° C. and a relative humidity of 50% in the magnetic tapes of Examples 1 to 14 fell within a range of 32 μm to 37 μm.

Based on the results, the magnetic tapes of Examples 1 to 14 were determined to have good head cleaning capacity and undergo little surface shaving on the magnetic layer side in a wide range of high and low humidity environments.

5. Center Average Surface Roughness Ra as Measured with a Noncontact Surface Profiler on the Surface on the Magnetic Layer Side The center average surface roughness Ra was measured on the surface on the magnetic layer side by the method set forth above with a noncontact optical roughness measuring device in the form of a NewView 5022 made by Zygo. The measurement results are given in Table 5.

TABLE 5

|  |  | Ex. 1 | Ex. 2 | Ex. 3 | Ex. 4 |
|---|---|---|---|---|---|
| Ferromagnetic powder |  | BF | BF | BF | BF |
| Thickness of magnetic layer |  | 0.10 μm | 0.10 μm | 0.10 μm | 0.10 μm |
| Thickness of nonmagnetic layer |  | 0.50 μm | 0.50 μm | 0.50 μm | 0.50 μm |
| Thickness of nonmagnetic support |  | 3.80 μm | 3.80 μm | 3.80 μm | 3.80 μm |
| Thickness of backcoat layer |  | 0.40 μm | 0.40 μm | 0.40 μm | 0.40 μm |
| Total thickness of magnetic tape |  | 4.80 μm | 4.80 μm | 4.80 μm | 4.80 μm |
| Residence time in cooling zone |  | 5 s. | 50 s. | 180 s. | 1 s. |
| Magnetic layer forming composition | Stearic acid/part | 2.0 | 2.0 | 2.0 | 2.0 |
|  | Amide stearate/part | 0.2 | 0.2 | 0.2 | 0.2 |
|  | Butyl stearate/part | 2.0 | 2.0 | 2.0 | 2.0 |
| Nonmagnetic layer forming composition | Stearic acid/part | 2.0 | 2.0 | 2.0 | 2.0 |
|  | Amide stearate/part | 0.2 | 0.2 | 0.2 | 0.2 |
|  | Butyl stearate/part | 2.0 | 2.0 | 2.0 | 2.0 |
| Centerline average surface roughness Ra as measured with noncontact surface profiler on the surface on the magnetic layer side of the magnetic tape |  | 1.5 nm | 1.6 nm | 1.8 nm | 1.5 nm |
| Outer layer portion C—H derived C concentration |  | 55 atom % | 65 atom % | 70 atom % | 45 atom % |
| AlFeSil abrasion width (temperature of 32° C. and a relative humidity of 50%) |  | 20 μm | 25 μm | 26 μm | 17 μm |

TABLE 5-continued

| | | | | | |
|---|---|---|---|---|---|
| AlFeSiI abrasion width (temperature of 32° C. and a relative humidity of 80%) | | 45 μm | 40 μm | 40 μm | 48 μm |
| Decrease in the S/N ratio due to repeated running (temperature of 32° C. and a relative humidity of 50%) | | 0.9 dB | 0.6 dB | 0.6 dB | 1.5 dB |
| Decrease in the S/N ratio due to repeated running (temperature of 32° C. and a relative humidity of 80%) | | 1.2 dB | 0.5 dB | 0.5 dB | 1.5 dB |

| | | Ex. 5 | Ex. 6 | Ex. 7 |
|---|---|---|---|---|
| Ferromagnetic powder | | BF | MP | BF |
| Thickness of magnetic layer | | 0.10 μm | 0.10 μm | 0.10 μm |
| Thickness of nonmagnetic layer | | 1.00 μm | 0.80 μm | 0.50 μm |
| Thickness of nonmagnetic support | | 3.40 μm | 3.60 μm | 3.40 μm |
| Thickness of backcoat layer | | 0.30 μm | 0.30 μm | 0.30 μm |
| Total thickness of magnetic tape | | 4.80 μm | 4.80 μm | 4.30 μm |
| Residence time in cooling zone | | 1 s. | 1 s. | 5 s. |
| Magnetic layer forming composition | Stearic acid/part | 2.0 | 2.0 | 2.0 |
| | Amide stearate/part | 0.2 | 0.2 | 0.2 |
| | Butyl stearate/part | 2.0 | 2.0 | 2.0 |
| Nonmagnetic layer forming composition | Stearic acid/part | 2.0 | 2.0 | 2.0 |
| | Amide stearate/part | 0.2 | 0.2 | 0.2 |
| | Butyl stearate/part | 2.0 | 2.0 | 2.0 |
| Centerline average surface roughness Ra as measured with noncontact surface profiler on the surface on the magnetic layer side of the magnetic tape | | 1.8 nm | 1.5 nm | 1.5 nm |
| Outer layer portion C—H derived C concentration | | 45 atom % | 45 atom % | 50 atom % |
| AlFeSiI abrasion width (temperature of 32° C. and a relative humidity of 50%) | | 17 μm | 15 μm | 18 μm |
| AlFeSiI abrasion width (temperature of 32° C. and a relative humidity of 80%) | | 48 μm | 45 μm | 47 μm |
| Decrease in the S/N ratio due to repeated running (temperature of 32° C. and a relative humidity of 50%) | | 1.5 dB | 1.5 dB | 1.3 dB |
| Decrease in the S/N ratio due to repeated running (temperature of 32° C. and a relative humidity of 80%) | | 1.3 dB | 1.5 dB | 1.0 dB |

| | | Ex. 8 | Ex. 9 | Ex. 10 | Ex. 11 |
|---|---|---|---|---|---|
| Ferromagnetic powder | | BF | BF | BF | BF |
| Thickness of magnetic layer | | 0.10 μm | 0.10 μm | 0.10 μm | 0.10 μm |
| Thickness of nonmagnetic layer | | 0.50 μm | 0.30 μm | 0.50 μm | 0.50 μm |
| Thickness of nonmagnetic support | | 3.40 μm | 3.30 μm | 3.80 μm | 3.80 μm |
| Thickness of backcoat layer | | 0.30 μm | 0.30 μm | 0.40 μm | 0.40 μm |
| Total thickness of magnetic tape | | 4.30 μm | 4.00 μm | 4.80 μm | 4.80 μm |
| Residence time in cooling zone | | 50 s. | 10 s. | 5 s. | 5 s. |
| Magnetic layer forming composition | Stearic acid/part | 2.0 | 2.0 | 4.0 | 6.0 |
| | Amide stearate/part | 0.2 | 0.2 | 0.5 | 1.0 |
| | Butyl stearate/part | 2.0 | 2.0 | 2.0 | 2.0 |
| Nonmagnetic layer forming composition | Stearic acid/part | 2.0 | 2.0 | 4.0 | 6.0 |
| | Amide stearate/part | 0.2 | 0.2 | 0.5 | 1.0 |
| | Butyl stearate/part | 2.0 | 2.0 | 2.0 | 2.0 |
| Centerline average surface roughness Ra as measured with noncontact surface profiler on the surface on the magnetic layer side of the magnetic tape | | 1.6 nm | 1.5 nm | 1.5 nm | 1.5 nm |
| Outer layer portion C—H derived C concentration | | 60 atom % | 55 atom % | 58 atom % | 58 atom % |
| AlFeSiI abrasion width (temperature of 32° C. and a relative humidity of 50%) | | 23 μm | 16 μm | 22 μm | 25 μm |
| AlFeSiI abrasion width (temperature of 32° C. and a relative humidity of 80%) | | 43 μm | 50 μm | 45 μm | 39 μm |
| Decrease in the S/N ratio due to repeated running (temperature of 32° C. and a relative humidity of 50%) | | 0.8 dB | 1.5 dB | 1.2 dB | 1.0 dB |
| Decrease in the S/N ratio due to repeated running (temperature of 32° C. and a relative humidity of 80%) | | 1.0 dB | 1.5 dB | 0.8 dB | 0.7 dB |

| | | Ex. 12 | Ex. 13 | Ex. 14 |
|---|---|---|---|---|
| Ferromagnetic powder | | BF | BF | BF |
| Thickness of magnetic layer | | 0.10 μm | 0.10 μm | 0.10 μm |
| Thickness of nonmagnetic layer | | 0.50 μm | 0.50 μm | 0.50 μm |
| Thickness of nonmagnetic support | | 3.80 μm | 3.80 μm | 3.80 μm |
| Thickness of backcoat layer | | 0.40 μm | 0.40 μm | 0.40 μm |
| Total thickness of magnetic tape | | 4.80 μm | 4.80 μm | 4.80 μm |
| Residence time in cooling zone | | 5 s. | 5 s. | 300 s. |
| Magnetic layer forming composition | Stearic acid/part | 2.0 | 2.0 | 2.0 |
| | Amide stearate/part | 0.2 | 0.2 | 0.2 |
| | Butyl stearate/part | 0.0 | 5.0 | 2.0 |

TABLE 5-continued

| | | | | |
|---|---|---|---|---|
| Nonmagnetic layer forming composition | Stearic acid/part | 2.0 | 2.0 | 2.0 |
| | Amide stearate/part | 0.2 | 0.2 | 0.2 |
| | Butyl stearate/part | 0.0 | 5.0 | 2.0 |
| Centerline average surface roughness Ra as measured with noncontact surface profiler on the surface on the magnetic layer side of the magnetic tape | | 1.5 nm | 1.5 nm | 2.3 nm |
| Outer layer portion C—H derived C concentration | | 55 atom % | 55 atom % | 75 atom % |
| AlFeSil abrasion width (temperature of 32° C. and a relative humidity of 50%) | | 20 μm | 20 μm | 26 μm |
| AlFeSil abrasion width (temperature of 32° C. and a relative humidity of 80%) | | 45 μm | 45 μm | 40 μm |
| Decrease in the S/N ratio due to repeated running (temperature of 32° C. and a relative humidity of 50%) | | 0.9 dB | 0.9 dB | 0.6 dB |
| Decrease in the S/N ratio due to repeated running (temperature of 32° C. and a relative humidity of 80%) | | 1.2 dB | 1.2 dB | 0.5 dB |

| | | Comp. Ex. 1 | Comp. Ex. 2 | Comp. Ex. 3 | Comp. Ex. 4 |
|---|---|---|---|---|---|
| Ferromagnetic powder | | BF | BF | BF | BF |
| Thickness of magnetic layer | | 0.10 μm | 0.10 μm | 0.10 μm | 0.10 μm |
| Thickness of nonmagnetic layer | | 1.00 μm | 1.00 μm | 1.00 μm | 1.00 μm |
| Thickness of nonmagnetic support | | 4.30 μm | 4.30 μm | 4.30 μm | 3.60 μm |
| Thickness of backcoat layer | | 0.60 μm | 0.60 μm | 0.60 μm | 0.60 μm |
| Total thickness of magnetic tape | | 6.00 μm | 6.00 μm | 6.00 μm | 5.30 μm |
| Residence time in cooling zone | | Not implemented | 5 s. | 50 s. | Not implemented |
| Magnetic layer forming composition | Stearic acid/part | 2.0 | 2.0 | 2.0 | 2.0 |
| | Amide stearate/part | 0.2 | 0.2 | 0.2 | 0.2 |
| | Butyl stearate/part | 2.0 | 2.0 | 2.0 | 2.0 |
| Nonmagnetic layer forming composition | Stearic acid/part | 2.0 | 2.0 | 2.0 | 2.0 |
| | Amide stearate/part | 0.2 | 0.2 | 0.2 | 0.2 |
| | Butyl stearate/part | 2.0 | 2.0 | 2.0 | 2.0 |
| Centerline average surface roughness Ra as measured with noncontact surface profiler on the surface on the magnetic layer side of the magnetic tape | | 1.5 nm | 1.5 nm | 1.6 nm | 1.8 nm |
| Outer layer portion C—H derived C concentration | | 35 atom % | 55 atom % | 65 atom % | 35 atom % |
| AlFeSil abrasion width (temperature of 32° C. and a relative humidity of 50%) | | 5 μm | 20 μm | 25 μm | 5 μm |
| AlFeSil abrasion width (temperature of 32° C. and a relative humidity of 80%) | | 60 μm | 45 μm | 40 μm | 60 μm |
| Decrease in the S/N ratio due to repeated running (temperature of 32° C. and a relative humidity of 50%) | | 0.5 dB | 0.3 dB | 0.3 dB | 0.8 dB |
| Decrease in the S/N ratio due to repeated running (temperature of 32° C. and a relative humidity of 80%) | | 0.6 dB | 0.5 dB | 0.5 dB | 0.8 dB |

| | | Comp. Ex. 5 | Comp. Ex. 6 | Comp. Ex. 7 |
|---|---|---|---|---|
| Ferromagnetic powder | | BF | BF | BF |
| Thickness of magnetic layer | | 0.10 μm | 0.10 μm | 0.10 μm |
| Thickness of nonmagnetic layer | | 0.50 μm | 0.50 μm | 0.50 μm |
| Thickness of nonmagnetic support | | 4.10 μm | 4.00 μm | 3.80 μm |
| Thickness of backcoat layer | | 0.60 μm | 0.40 μm | 0.40 μm |
| Total thickness of magnetic tape | | −5.30 μm | 5.00 μm | 4.80 μm |
| Residence time in cooling zone | | Not implemented | Not implemented | Not implemented |
| Magnetic layer forming composition | Stearic acid/part | 2.0 | 2.0 | 2.0 |
| | Amide stearate/part | 0.2 | 0.2 | 0.2 |
| | Butyl stearate/part | 2.0 | 2.0 | 2.0 |
| Nonmagnetic layer forming composition | Stearic acid/part | 2.0 | 2.0 | 2.0 |
| | Amide stearate/part | 0.2 | 0.2 | 0.2 |
| | Butyl stearate/part | 2.0 | 2.0 | 2.0 |
| Centerline average surface roughness Ra as measured with noncontact surface profiler on the surface on the magnetic layer side of the magnetic tape | | 1.5 nm | 1.5 nm | 1.5 nm |
| Outer layer portion C—H derived C concentration | | 35 atom % | 35 atom % | 35 atom % |
| AlFeSil abrasion width (temperature of 32° C. and a relative humidity of 50%) | | 5 μm | 5 μm | 5 μm |
| AlFeSil abrasion width (temperature of 32° C. and a relative humidity of 80%) | | 60 μm | 60 μm | 60 μm |
| Decrease in the S/N ratio due to repeated running (temperature of 32° C. and a relative humidity of 50%) | | 0.9 dB | 0.9 dB | 2.8 dB |
| Decrease in the S/N ratio due to repeated running (temperature of 32° C. and a relative humidity of 80%) | | 1.0 dB | 1.0 dB | 2.5 dB |

| | Comp. Ex. 8 | Comp. Ex. 9 | Comp. Ex. 10 |
|---|---|---|---|
| Ferromagnetic powder | BF | MP | BF |
| Thickness of magnetic layer | 0.10 μm | 0.10 μm | 0.10 μm |

TABLE 5-continued

|  |  |  |  |  |
|---|---|---|---|---|
| Thickness of nonmagnetic layer |  | 0.50 μm | 0.50 μm | 1.00 μm |
| Thickness of nonmagnetic support |  | 3.40 μm | 3.40 μm | 3.40 μm |
| Thickness of backcoat layer |  | 0.30 μm | 0.30 μm | 0.30 μm |
| Total thickness of magnetic tape |  | 4.30 μm | 4.30 μm | 4.80 μm |
| Residence time in cooling zone |  | Not implemented | Not implemented | Not implemented |
| Magnetic layer forming composition | Stearic acid/part | 2.0 | 2.0 | 2.0 |
|  | Amide stearate/part | 0.2 | 0.2 | 0.2 |
|  | Butyl stearate/part | 2.0 | 2.0 | 2.0 |
| Nonmagnetic layer forming composition | Stearic acid/part | 2.0 | 2.0 | 2.0 |
|  | Amide stearate/part | 0.2 | 0.2 | 0.2 |
|  | Butyl stearate/part | 2.0 | 2.0 | 2.0 |
| Centerline average surface roughness Ra as measured with noncontact surface profiler on the surface on the magnetic layer side of the magnetic tape |  | 1.5 nm | 1.8 nm | 1.8 nm |
| Outer layer portion C—H derived C concentration |  | 35 atom % | 40 atom % | 35 atom % |
| AlFeSil abrasion width (temperature of 32° C. and a relative humidity of 50%) |  | 5 μm | 7 μm | 5 μm |
| AlFeSil abrasion width (temperature of 32° C. and a relative humidity of 80%) |  | 60 μm | 65 μm | 60 μm |
| Decrease in the S/N ratio due to repeated running (temperature of 32° C. and a relative humidity of 50%) |  | 3.8 dB | 4 dB | 2.5 dB |
| Decrease in the S/N ratio due to repeated running (temperature of 32° C. and a relative humidity of 80%) |  | 4.7 dB | 4.5 dB | 2.7 dB |

|  |  | Comp. Ex. 11 | Comp. Ex. 12 | Comp. Ex. 13 |
|---|---|---|---|---|
| Ferromagnetic powder |  | BF | BF | BF |
| Thickness of magnetic layer |  | 0.10 μm | 0.10 μm | 0.10 μm |
| Thickness of nonmagnetic layer |  | 0.50 μm | 0.50 μm | 0.50 μm |
| Thickness of nonmagnetic support |  | 3.80 μm | 3.80 μm | 3.80 μm |
| Thickness of backcoat layer |  | 0.40 μm | 0.40 μm | 0.40 μm |
| Total thickness of magnetic tape |  | 4.80 μm | 4.80 μm | 4.80 μm |
| Residence time in cooling zone |  | Not implemented | Not implemented | Not implemented |
| Magnetic layer forming composition | Stearic acid/part | 4.0 | 6.0 | 2.0 |
|  | Amide stearate/part | 0.5 | 1.0 | 0.2 |
|  | Butyl stearate/part | 2.0 | 2.0 | 2.0 |
| Nonmagnetic layer forming composition | Stearic acid/part | 4.0 | 6.0 | 2.0 |
|  | Amide stearate/part | 0.5 | 1.0 | 0.2 |
|  | Butyl stearate/part | 2.0 | 2.0 | 2.0 |
| Centerline average surface roughness Ra as measured with noncontact surface profiler on the surface on the magnetic layer side of the magnetic tape |  | 1.5 nm | 1.5 nm | 1.5 nm |
| Outer layer portion C—H derived C concentration |  | 35 atom % | 38 atom % | 40 atom % |
| AlFeSil abrasion width (temperature of 32° C. and a relative humidity of 50%) |  | 5 μm | 7 μm | 10 μm |
| AlFeSil abrasion width (temperature of 32° C. and a relative humidity of 80%) |  | 60 μm | 58 μm | 55 μm |
| Decrease in the S/N ratio due to repeated running (temperature of 32° C. and a relative humidity of 50%) |  | 2.8 dB | 3 dB | 2.2 dB |
| Decrease in the S/N ratio due to repeated running (temperature of 32° C. and a relative humidity of 80%) |  | 2.5 dB | 3.2 dB | 2.3 dB |

*Stearic acid overcoat

Based on the results given in Table 5, the following points can be determined:
(1) In the magnetic tapes of Comparative Examples 1 to 6 which exceeded 4.80 μm in total thickness, regardless of whether the outer layer portion C—H derived C concentration was greater than or equal to 45 atom % or was less than 45 atom %, the drop in the S/N ratio with repeated running was small in both high and low humidity environments. That is, no correlation was observed between the outer layer portion C—H derived C concentration and the drop in the S/N ratio with repeated running in the above environments.
(2) By contrast, a comparison of Examples 1 to 14 and Comparative Examples 7 to 13 revealed that in magnetic tapes less than or equal to 4.80 μm in total thickness, the drop in the S/N ratio with repeated running in high and low humidity environments can be inhibited when the outer layer portion C—H derived C concentration was greater than or equal to 45 atom %.

An aspect of the present invention is useful in the field of manufacturing magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape, which comprises, on a nonmagnetic support, a nonmagnetic layer comprising nonmagnetic powder and binder, and on the nonmagnetic layer, a magnetic layer comprising ferromagnetic powder and binder;
    wherein a total thickness of the magnetic tape is less than or equal to 4.80 µm;
    at least the magnetic layer comprises one or more components selected from the group consisting of a fatty acid and a fatty acid amide; and
    a C—H derived carbon, C, concentration calculated from a C—H peak area ratio in a C1s spectrum obtained by X-ray photoelectron spectroscopy conducted at a photoelectron take-off angle of 10 degrees on a surface on the magnetic layer side of the magnetic tape is greater than or equal to 45 atom %.

2. The magnetic tape according to claim 1, wherein the C—H derived carbon, C, concentration ranges from 45 atom % to 80 atom %.

3. The magnetic tape according to claim 1, wherein the C—H derived carbon, C, concentration ranges from 45 atom % to 70 atom %.

4. The magnetic tape according to claim 1, wherein the C—H derived carbon, C, concentration ranges from 50 atom % to 65 atom %.

5. The magnetic tape according to claim 1, wherein the magnetic layer and the nonmagnetic layer each comprises one or more components selected from the group consisting of a fatty acid and a fatty acid amide.

6. The magnetic tape according to claim 1, wherein either one of, or both, the magnetic layer and the nonmagnetic layer further comprises a fatty acid ester.

7. The magnetic tape according to claim 1, which comprises a backcoat layer on the nonmagnetic support on an opposite side from the magnetic layer and nonmagnetic layer.

8. The magnetic tape according to claim 1, a center line average surface roughness, Ra, as measured with a noncontact surface profiler on the surface on the magnetic layer side of the magnetic tape is less than or equal to 1.8 nm.

9. The magnetic tape according to claim 1, wherein the ferromagnetic powder is selected from the group consisting of ferromagnetic hexagonal ferrite powder and ferromagnetic metal powder.eb 10. A method of manufacturing a magnetic tape, wherein the magnetic tape is a magnetic tape, which comprises, on a nonmagnetic support, a nonmagnetic layer comprising nonmagnetic powder and binder, and on the nonmagnetic layer, a magnetic layer comprising ferromagnetic powder and binder;
    wherein a total thickness of the magnetic tape is less than or equal to 4.80 µm;
    at least the magnetic layer comprises one or more components selected from the group consisting of a fatty acid and a fatty acid amide; and
    a C—H derived carbon, C, concentration calculated from a C—H peak area ratio in a C1s spectrum obtained by X-ray photoelectron spectroscopy conducted at a photoelectron take-off angle of 10 degrees on a surface on the magnetic layer side of the magnetic tape is greater than or equal to 45 atom %; and
    the method comprises a step of forming a nonmagnetic layer and a step of forming a magnetic layer, wherein the step of forming the nonmagnetic layer comprises:
    a coating step of forming a coating layer by coating on a nonmagnetic support a nonmagnetic layer forming composition comprising one or more components selected from the group consisting of a fatty acid and a fatty acid amide, nonmagnetic powder, binder, and solvent;
    a heating and drying step of drying the coating layer by a heat treatment; and
    the step of forming the nonmagnetic layer further comprises, between the coating step and the heating and drying step, a cooling step of cooling the coating layer.

11. The method of manufacturing a magnetic tape according to claim 10, wherein
    the cooling step is conducted by placing the coating layer in a cooling atmosphere of −10° C. to 0° C.

12. The method of manufacturing a magnetic tape according to claim 10, wherein
    the nonmagnetic layer forming composition comprises ketone solvent.

13. The method of manufacturing a magnetic tape according to claim 10, wherein
    the step of forming a magnetic layer comprises:
    a coating step of forming a coating layer by coating on a nonmagnetic layer a magnetic layer forming composition comprising ferromagnetic powder, binder, and solvent; and
    a heating and drying step of drying the coating layer by a heat treatment.

14. The method of manufacturing a magnetic tape according to claim 13, wherein
    the magnetic layer forming composition further comprises one or more components selected from the group consisting of a fatty acid and a fatty acid amide.

15. The method of manufacturing a magnetic tape according to claim 13, wherein
    either one of, or both, the nonmagnetic layer forming composition and the magnetic layer forming composition further comprises a fatty acid ester.

* * * * *